United States Patent
Shaw et al.

(10) Patent No.: US 7,403,326 B2
(45) Date of Patent: Jul. 22, 2008

(54) DOPED FIBER SCENE PROJECTION SYSTEM AND METHOD

(75) Inventors: Brandon Shaw, Woodbridge, VA (US); Jasbinder S. Sanghera, Ashburn, VA (US); Ishwar D. Aggarwal, Fairfax Station, VA (US); Peter A. Thielen, Cerritos, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 272 days.

(21) Appl. No.: 11/296,714

(22) Filed: Dec. 2, 2005

(65) Prior Publication Data

US 2007/0127529 A1    Jun. 7, 2007

(51) Int. Cl.
| G02F 1/01 | (2006.01) |
| G02F 1/35 | (2006.01) |
| G02F 2/02 | (2006.01) |
| G02B 6/00 | (2006.01) |
| H01S 3/30 | (2006.01) |

(52) U.S. Cl. .......................... 359/326; 359/327; 385/1; 385/142; 385/901; 372/6

(58) Field of Classification Search ...................... None
See application file for complete search history.

(56) References Cited

U.S. PATENT DOCUMENTS 6,363,088 B1 * 3/2002 Alphonse et al. ............... 372/6
6,480,634 B1 * 11/2002 Corrigan ....................... 385/4

* cited by examiner

*Primary Examiner*—M. R. Connelly-Cushwa
(74) *Attorney, Agent, or Firm*—John J Karasek; Suresh Koshy

(57) ABSTRACT

This invention pertains to a scene projection system and a method for projecting a scene that can simulate light temperature of above 2000 K. The system comprises of a light source part for generating light at a lower wavelength; a means part for individually controlling dynamic range, contrast, brightness, temporal characteristics and temporal dynamics of the light; a rare earth doped fiber part that re-emits the output light at a higher wavelength; and a means part for conveying light between its parts. The method comprises steps of generating light at a lower wavelength; individually controlling temporal characteristics, temporal dynamics, brightness and contrast of the light; passing the light through a rare earth-doped fiber; and re-emitting the light at a higher wavelength.

18 Claims, 5 Drawing Sheets

DOPED FIBER SCENE PROJECTION SYSTEM AND METHOD

FIELD OF THE INVENTION

This invention pertains to doped fiber projection system and method for projecting infrared scene, particularly for hardware-in-the-loop (HWIL) testing.

DESCRIPTION OF RELATED PRIOR ART

Hardware-in-the-loop simulation is used to test and evaluate seekers and electro-optic systems by projecting a synthetic environment to stimulate the system and evaluate the response of the system to the external synthetic environment. Hardware-in-the-loop testing offers great cost savings regarding field testing of these systems. Testing in simulators also removes many unknown variables inherent in field tests and allows careful control of the testing variables for complete characterization of the electro-optic system. Current hardware-in-the-loop simulation systems are often based upon resistor array technologies. In these systems, the synthetic infrared scene is generated through controlled heating of the tiny resistive emitters on the array. Due to the resistive heating nature of the arrays and difficult thermal management, temperature simulation by the arrays is limited to temperatures of typically less than 800 K. There is, however, a need for simulation of very high temperature artifacts, such as flares, countermeasures and rocket exhaust. Temperatures of these articles are often in the range of greater than 2000 K. Consequently, resistor array technology fails to meet the requirements for such testing. Resistive prior art approaches can only generate "cool" scenes not "hot" scenes.

The article entitled "Rare earth doped glass fibers as infrared sources for IRSS" by L. B. Shaw, D. T Schaasfsma, B. Cole, B. B. Harbison, J. S. Sanghera and I. D. Aggarwal, published in April 1998 issue of vol. 3368 of SPIE, reports on the characteristics of rare earth doped chalcogenide glasses and their applicability for infrared scene simulation. The characteristics of $Pr^{3+}$-doped chalcogenide fiber sources and arrays operating in the mid-wavelength region of 3-5 μm are reported. In particular, FIG. 6 of the article is a conceptualized drawing of an infrared scene simulation system based on rare earth doped chalcogenide fiber arrays.

The article entitled "Development of IR Emitting Infrared Fibers at the Naval Research Laboratory" by L. B. Shaw, B. Cole, J. S. Sanghera, I. D. Aggarwal, F. H. Kung, S. Bayya, R. Mossadegh, P. A. Thielen, J. R. Kircher and R. L. Murrer, Jr., published in vol. 4366 (2001) of SPIE, reports on high brightness infrared emitting fibers for mid-wavelength testing. These fibers, based on rare-earth doped chalcogenide glass, emit in the range of 3.5-5 μm and are capable of simulating very high temperatures of over 2000 K in this band. The fiber sources operate at room temperature, are environmentally tolerant and can be formed into fiber bundles with high fill factors exceeding 70% and low pixel-to-pixel cross-talk of below about 2% for infrared scene generation. In particular, FIG. 3 of the article is an infrared scene generation concept using infrared emitting fiber array in combination with a resistor array.

U.S. Pat. No. 6,928,227 discloses an invention that pertains to an optical device and method for using a chalcogenide waveguide to amplify a pump light beam by means of stimulated Raman scattering and obtaining a depleted pump light beam and an amplified beam at a higher wavelength than the wavelength of the depleted pump light beam.

OBJECTS AND BRIEF SUMMARY OF THE INVENTION

An object of this invention is a scene projection system which uses glass fibers doped with rare earth ions to simulate temperatures in excess of 800 K, typically in excess of 2000 K, by non-resistive means.

Another object of the invention is a non-resistive scene projection system and method that can be operated at room temperature in an environmentally tolerant surroundings using glass fibers that can be formed into fiber bundles with high fill factors of on the order of 70% and higher and low pixel-to-pixel cross-talk on the order of 2%.

Another object of this invention is a non-resistive scene projection system and method that includes the use of a light source that supplies light at a near infrared range of 1-2 μm range and re-emits it in the infrared range of 3-5 μm range.

Another object of this invention is a scene projection system and method that can project the desired scene essentially instantaneously.

Another object of this invention is scene simulation and method for simulating hot scenes by means of an apparatus that typically includes at least one splitter and at least one attenuator.

These and other objects can be attained by a projection scene system and method characterized by glass fibers of low phonon energy doped with rare earth element, compound or a material that can produce same, and a means for controlling power and other parameters in each of the doped fibers.

DETAILED DESCRIPTION OF THE INVENTION

This invention pertains to a method for projecting a scene in the infrared region and apparatus therefor. The apparatus includes high brightness infrared fibers emitting in the wavelength range of 3-5 μm typically pumped by a fiber pump laser operating at wavelength of about 2 μm. The brightness and temporal characteristics of the infrared fiber emitters is controlled by attenuating and modulating the pump to the emitters using fiber-based variable optical attenuators or other means. Emitter output can simulate non-resistively temperatures in excess of 800 K, more typically in excess of 2000 K. The method includes the steps of generating light at a lower wavelength; individually controlling temporal characteristics, temporal dynamics, brightness and contrast of the light;

passing the light through a rare earth-doped fiber; and re-emitting the light at a higher wavelength.

Glass fibers, particularly chalcogenide glass fibers, doped with rare earth ions, are known. The high brightness mid-infrared output of the fibers is able to simulate mid-infrared emission coming from very hot blackbodies and thus the fibers are able to simulate very high temperatures of about 2000 K and above but typically below the surface temperature of the sun, i.e., which is on the order of below 6000 K, since, it is believed that, scene projection will not require temperature simulation above 6000 K.

Figure 3:
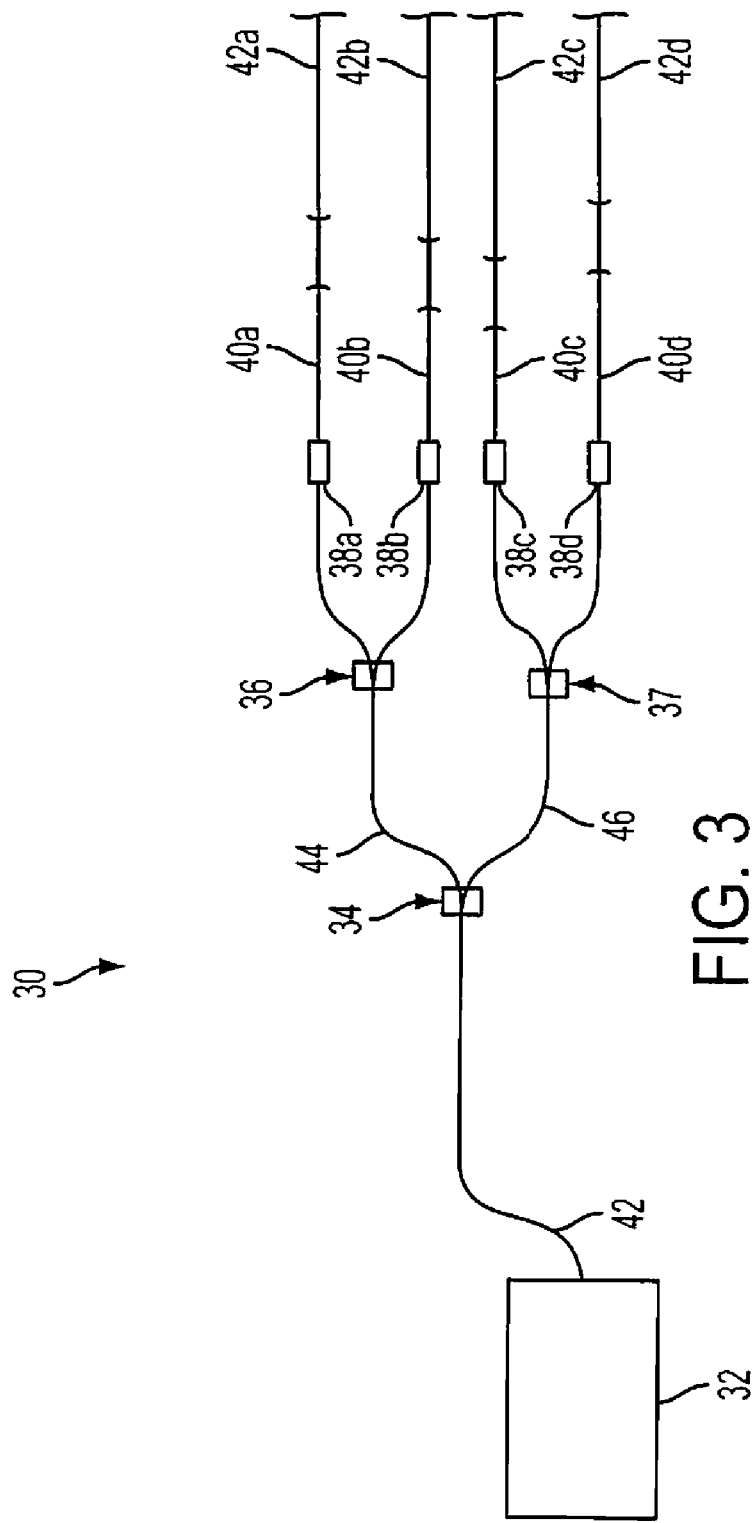
FIG. 3 is an optical layout of an embodiment of the invention showing a fiber laser light source, light conveying laser fibers, attenuation/modulation means and doped fibers that re-emit light at a higher wavelength in the infrared.

The present invention, shown schematically in FIG. 3, illustrates a scene projection system which utilizes the rare earth doped infrared fiber sources and is able to generate high resolution in excess of about 128×128 pixels and high dynamic range of higher than about 20 dB synthetic images in the infrared. In this embodiment, a pump laser is split into several channels. The pump laser light in each channel is controlled by modulators and attenuators and delivered to the rare earth doped infrared fiber sources which then emit light in the infrared region of 3-5 μm. The rare earth doped infrared fiber sources then, in essence, act as individual "pixels" and the synthetic image is generated by controlling the modulation and attenuation of the pump light in each channel which in turn controls the dynamic range, contrast, brightness, temporal characteristics and temporal dynamics of each fiber "pixel." In one embodiment, the invention is typically composed of a commercially available pump laser, typically a silica-based fiber laser; a means of splitting the pump laser into several channels, typically a cascaded silica-based 50/50 fiber couplers or 1×N couplers; means of modulating and controlling the pump power in each of the channels, typically a fiber-based variable optical attenuator; and individual rare earth doped fiber emitters or an array of such emitters which serve as "pixels" of the generated infrared scene. The resolution of the scene is defined as the number of emitters.

Figure 6:
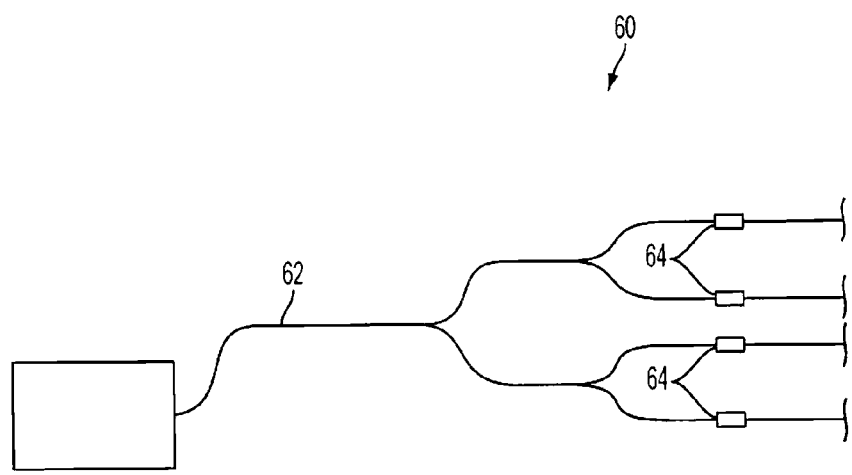
FIG. 6 is a schematic layout of an alternate embodiment of a high brightness infrared fiber source projector using a rare earth doped fiber before splitting of the light source into a multitude of channels.

Another variation of the invention, shown schematically in FIG. 6, envisions a single rare earth doped infrared fiber source which is pumped by a pump laser. The output of the single rare earth doped infrared fiber source is then split into several channels using appropriate optics of fiber optics which function in the mid-infrared region, for example, cascaded 1×2 or 1×N fiber splitters. The output of each channel is controlled by appropriate modulators and attenuators which operate in the infrared region, such as variable optic attenuators designed to operate in the spectral region of the fiber output. In this embodiment; each "pixel" is the generated scene is simply the output from each channel. The dynamic range, contrast, brightness, temporal characteristics, and temporal dynamics of each "pixel" are controlled by the attenuation and modulation of the infrared radiation in each channel.

Glass fibers suitable herein are low phonon infrared emitting fibers, particularly chalcogenide glass fibers, doped with a rare earth. The fibers emit broadband mid-wavelength infrared and long wavelength infrared radiation when excited by a light source, particularly a laser source, in the near infrared of 1-2 μm. Such sources offer the advantages of compact size, high reliability and room temperature operation. Any low phonon glass that can form glass fibers and does not quench rare earth emission, with phonon energy below about 350-400 cm$^{-1}$, is suitable herein. The herein preferred glass fibers are chalcogenide glasses based upon the chalcogen elements of sulfur, selenium and tellurium. Since these glasses possess lower phonon energies than oxide and fluoride based glasses, the multiphonon edge of these glasses is shifted to longer wavelengths and results in increased transparency in the infrared region. In general, these glasses are chemically and mechanically durable and can be drawn into fibers. Typical losses in undoped glassed typically range from 0.1 to 2 dB/m although losses as low as 0.047 dB/m, and lower, have been achieved. The core sizes of the drawn fibers, the effective portion of the fiber for purposes herein, typically range from a few microns to hundreds of microns in diameter.

Many rare earth ions have electronic transitions that emit in the mid-wave infrared and long-wave infrared regions. In silica glass, these transitions of the rare earth ions are quenched. In chalcogenide glass, for instance, these transitions are active and exhibit broadband emission when optically pumped in the near-infrared region. Fibers fabricated from these rare earth doped glasses can be utilized to project infrared scenes in the mid-wave infrared and long-wave infrared regions.

Figure 1:
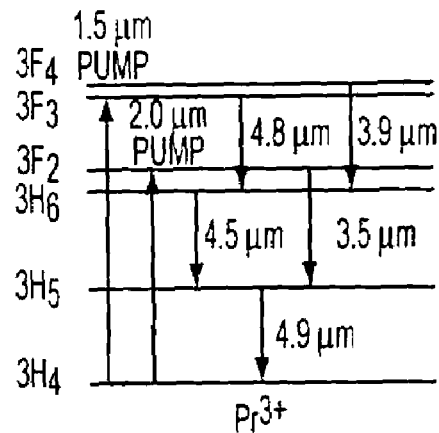
FIG. 1 is an energy level diagram showing the $Pr^+$ ion transitions in the range of 3-5 μm and two possible pumping wavelengths for exciting the $Pr^+$ ion for mid-wavelength infrared emission.
Figure 2:
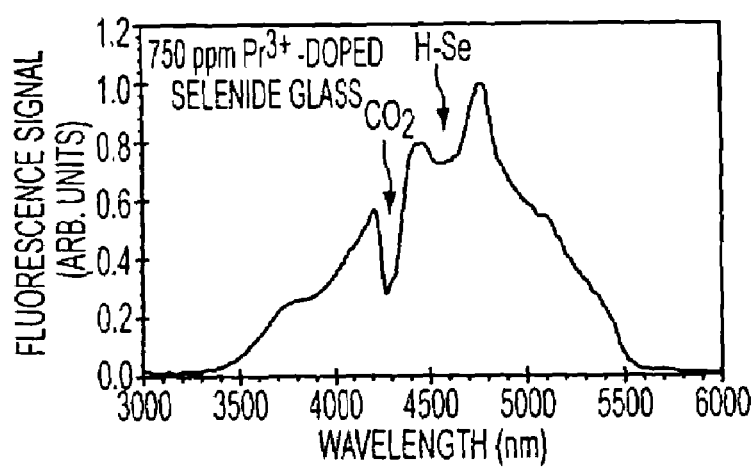
FIG. 2 is a plot of Fluorescence Signal vs. Wavelength and shows room temperature mid-wavelength infrared emission of $Pr^+$-doped selenide glasses.

The rare earth ion $Pr^{3+}$ has many transitions in the mid-wave infrared region from 3 to 5 μm, as shown in FIG. 1. When $Pr^{3+}$ ion is doped into a conventional oxide or fluoride based glass, the high phonon energy of the glasses, which is over 600 cm$^{-1}$, quenches the mid-wave infrared region emission. The phonon energy of the selenide-based chalcogenide glasses is much lower at about 350 cm$^{-1}$ and, as a result, $Pr^{3+}$ ion doped into these glasses emits light on many mid-wave infrared transitions when pumped at an appropriate wavelength in the near-infrared region. Pumping can occur either at 1.5 μm or 2.0 μm. FIG. 1 shows room temperature, mid-wave infrared region emission from a 750 ppm $Pr^{3+}$-doped selenide glass when pumped in the near infrared region at 1.5 μm. The mid-wave infrared light shown is a result of emission from several $Pr^+$ transitions. The overlap of these transitions coupled with the broad linewidth of each transition results in a continuous emission spectrum in the region of 3.5-5 μm. The dips shown in the spectrum are a result of atmospheric $CO_2$ absorption in the detection system optical path and residual H—Se impurity absorption in the glass matrix.

As already noted, praseodymium ($Pr^+$) doped chalcogenide fiber can be pumped, for purposes herein, at 1.5 μm and 2.0 μm, whereas its emissions are between 3 μm and 5 μm. Terbium ($Tb^{3+}$) doped fibers can be pumped at about 2.0 μm and have emissions at about 8.0 μm and 10 μm. Dysprosium ($Dy^{3+}$), erbium ($Er^{3+}$), terbium ($Tb^{3+}$), and other rare earths, can be used herein. Therefore, of all rare earths, presently preferred are praseodymium and terbium ions for doping fibers, particularly chalcogenide fibers, for purposes herein.

The infrared emitting doped chalcogenide fibers have several characteristics that are desirable as sources of mid wavelength infrared radiation. These fibers are mechanically and chemically stable and are not subject to burnout or aging affects that can degrade or change spectral output over time. The fiber sources operate at room temperature, although cryogenic operation is possible. Since the fibers do not heat up during operation, even when the apparent temperature due to the emission simulation is thousands of degrees Celsius, no heat sink is necessary. Furthermore, the active fibers are optically pumped and thus can be remotely operated using silica fiber connected to a diode laser pump for operation in electrically more sensitive environments.

Figure 4:
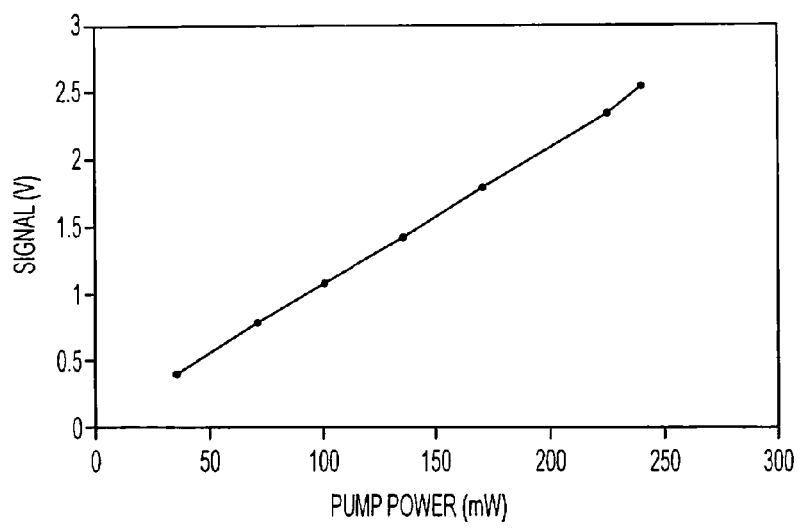
FIG. 4 is a plot of output power (Signal) against input power (Pump power) for a one element of a four emitter system of FIG. 1.

One embodiment of the invention herein is illustrated in FIG. 3 showing a schematic of the layout of a four emitter infrared fiber source projector 30. The invention includes a light source 32, typically a 2 μm thulium laser. Output fiber from the light source is fusion spliced to a splitter 34, which can be a commercially available 1×2 50/50 splitter operating at 2 μm wavelength. The arms of the 34 splitter are fusion spliced to two similar 1×2 splitters 36, 37 effectively dividing the output pump light into four individual and equal power channels. The outputs of the final chain of the splitters 36, 37 are fusion spliced to fiber optic variable attenuators 38 (*a*)-(*d*). The attenuators function as attenuators and modulators in each channel to individually control the pump light power and temporal characteristics. In this particular set-up, each attenuator is capable of about 30 dB dynamic range and about 15 ms temporal response for modulation. The attenuators are each controlled by a 0-15 volt analog input from a digital to analog board mounted in a computer. The output from each attenuator is coupled typically by a multimode silica delivery fibers 40 (*a*)-(*d*) which in turn is coupled to rare earth doped input fiber emitters 42 (*a*)-(*d*). The contrast, brightness, temporal characteristics and temporal dynamics of each fiber output is controlled by the modulation and attenuation of the power reaching each fiber through the attenuator in each channel. FIG. 4 shows the output signal of a single fiber "pixel" emitter as a function of the pump power reaching the "pixel."

Operation of the FIG. 3 embodiment was initiated by continuous wave laser 32. Assuming that the laser operates at a power of 2 watts and emits light at a wavelength of 2.0 μm, light entered fiber 42, which can be any fiber but in this case was single mode (SMF-28) silica core/clad fiber of 8 μm/125 μm size. Light in fiber 42 was conveyed to splitter 34 where light was split between two paths, i.e, fiber 44 and fiber 46. If the splitter is 50/50, half of the light is conveyed into fiber 44 and the other half, into fiber 46. Any splitter can be used, such as 90/10 or 70/30, however, here the splitters were 50/50. Light in fiber 44 was conveyed to splitter 36 and light in fiber 46 was conveyed to splitter 37 where light in splitters 36, 37 was split evenly into path fibers 40 (*a*), (*b*), (*c*) and (*d*). All splitters were 50/50 splitters with wavelength of 2 μm. Light in fibers 40 (*a*), (*b*), (*c*) and (*d*) was then conveyed to attenuators 38(*a*)-(*d*) provided in each line. The attenuators were connected to a computer whereby each fiber individually was adjusted with respect to light power, temporal characteristics and scene design, which was imparted by the computer. The attenuators can be same or different, as can be any component of the system, and the attenuators used herein were MEMS based variable optical attenuators. Light in fibers 40 (*a*), (*b*), (*c*) and (*d*), after passing through the attenuators, was then delivered to rare earth doped fibers 42 (*a*), (*b*), (*c*) and (*d*) where the laser light was received in a near infrared region and re-emitted at a higher infrared region. In this case, the 2-μm light was received at 2 μm and re-emitted at a higher infrared range of 3-5 μm. Fibers 42, 44, 46 and 40 (*a-d*) are typically silica fibers. Fibers on both sides of the attenuators were single mode silica fibers which were spliced to multimode silica fibers before being spliced to the doped fibers to decrease intensity on the doped fibers and thus prevent fiber damage.

Figure 5:
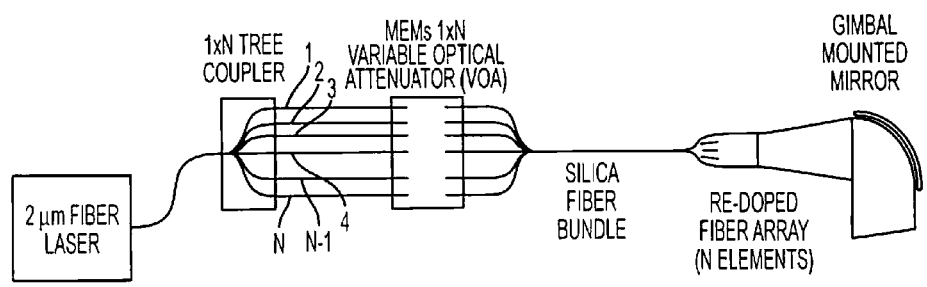
FIG. 5 is a schematic optical layout of an N element array.

FIG. 5 shows a schematic of n×n resolution, high brightness, high dynamic range infrared simulator based on fiber technology for hardware-in-the-loop testing. Here, each channel was coupled to each element of an n×n fiber array (n×n=N) which array was used to project a scene with a resolution of n×n "pixels." The fiber array was constructed from a bundle of individual rare earth doped infrared fibers.

The optical layout shown in FIG. 5 operates on the same principles as the embodiment shown in FIG. 3.

FIG. 6 shows a schematic of another embodiment of the infrared fiber simulator apparatus 60 which was a single infrared doped fiber 62. In this embodiment, the infrared light source was split into n×n channels using cascaded 1×2 chalcogenide 50/50 fiber couplers. The output of each coupler in the cascade was coupled to an infrared fiber based attenuator which controlled the modulation and attenuation of each channel to achieve control of the temporal and spatial dynamics of the generated scene.

The embodiment shown in FIG. 6 operates essentially in the same way as the embodiment shown in FIG. 3. Here, however the fiber can operate as a laser, as an ASE source, or emit by spontaneous emission.

EXAMPLE 1

This example demonstrates the embodiment of FIG. 3, i.e., the four emitter, high brightness fiber source infrared simulator for hardware-in-the-loop simulation system.

Laser 32 was a 5 watt commercially available pump laser operating at 2 μm. The output fiber 42 from the laser was fusion spliced to a 1×2 50/50 splitter 34 operating at a wavelength of 2 μm. The arms 44,46 of splitter 34 were fusion spliced to two similar 1×2 splitters 36,37, effectively dividing the output pump light into four individual and equal power channels 40(*a*)-(*d*), which were standard silica fibers SMF-28. The outputs of the final chain of the 1×2 splitters were fusion spliced to fiber optic variable optical attenuators 38(*a*)-(*d*). The variable optical attenuators act as attenuators and modulators in each channel to control the pump light power and temporal characteristics. Each variable optical attenuator was capable of about 30 dB dynamic range and about 15 ms temporal response for modulation. Each of the variable optical attenuators was controlled by 0-15 V analog input from a digital to analog board mounted in a computer. The output from each variable optical attenuator was coupled to a multimode silica SMF-28 fiber 40(*a*)-(*d*), which in turn, was coupled to a rare earth doped fiber emitter 42(*a*)-(*d*). The contrast, brightness, temporal characteristics and temporal dynamics of each doped output fiber 42(*a*)-(*d*) was controlled by the modulation and attenuation of the power reaching each doped fiber 42(*a*)-(*d*) through the variable optical attenuators 38(*a*)-(*d*) in each channel. Output powers were typically greater than 100 μW per fiber in the 3-5 μm band.

EXAMPLE 2

This example demonstrates the embodiment of FIG. 5, which shows a schematic of a high resolution n×n infrared scene simulator based upon the fiber technology. Here, each channel was coupled to each element of an n×n fiber array (n×n=N total elements) which was used to project a scene with a resolution of n×n pixels. The fiber array was constructed from a bundle of individual rare earth doped infrared fibers but can also be constructed from a rare earth doped glass extruded through a structured hole capillary plate with n×n holes.

EXAMPLE 3

This example shows the embodiment of FIG. 6, which shows a schematic of a of an alternate embodiment of the infrared fiber simulator. Here, a single infrared fiber source 62 is used. The infrared fiber source is split into n×n channels using a cascaded 1×2 chalcogenide 50/50 fiber coupler. The output of each coupler in the cascade is coupled to an infrared fiber based variable optical attenuator which controls the modulation and attenuation of each channel to achieve control of the temporal and spatial dynamics of the generated scene.

The use of rugged fiber optic components is a desirable advantage for these systems. Current resistor arrays systems are subject to pixel burnout, environmental aging and short life cycles and low yield during fabrication. As a result, commercially available resistor array scene projectors are very expensive to purchase and maintain. Also, they require external cooling resources and environmental resources to maintain their stability and prolong their useful life. The infrared fiber optic systems of this invention, by contrast, are not subject to burnout, show no environmental aging, are mechanically and chemically durable, and are producible in high yield and at low cost. This should dramatically lower the purchase and operating costs of the hardware-in-the loop testing systems based upon this technology.

As already noted, the basis of this invention involves a pump means, a high brightness infrared source means, a means of splitting the pump or infrared source light into several channels, and a means of controlling the attenuation and modulation of each channel to generate a dynamic infrared scene. While the use of fiber optic components is the most elegant, rugged and simple implementation of this invention, other embodiments are possible that could involve bulk or even optical splitters for each channel, free-space digital mirror device modulators and attenuators or even alternate sources, such as infrared diode lasers, solid state lasers, or non-linear converters. The use of alternate pump sources, such as diode lasers, is also possible. Diode laser use would allow direct modulation and attenuation of the of the pump light without the use of variable optical attenuators if each fiber "pixel" is pumped by an individual diode laser.

Other alternatives to this invention include the use of different rare earth glasses. The praseodymium doped chalcogenide glass generates broadband infrared scenes in the 3-5 µm region. Other glasses and rare earths can be used to generate scenes in other wavelength bands. For example, Tb-doped chalcogenide glass has emission bands around 7.5-8 µm as well as 10-11 µm and thus can be used for scene generation in long-wave infrared wavelength band. The pump and design of the fiber optics would have to be chosen accordingly.

While presently preferred embodiments have been shown of the novel and unobvious scene projection systems and use methods thereof, and of the several modifications discussed, persons skilled in this art will readily appreciate that various additional changes and modifications may be made without departing from the spirit of the invention, as defined and differentiated by the following claims.

What is claimed is:

1. A scene projection system comprising a light source part for generating light at a lower wavelength; a means part for individually controlling dynamic range, contrast, brightness, temporal characteristics and temporal dynamics of the light; a rare earth doped fiber part that re-emits the output light at a higher wavelength; and a means part for conveying light between its parts, wherein said light source part emits light in the near infrared region and said rare earth doped fiber part re-emits the light in the infrared region.

2. The system of claim 1 which includes at least one splitter part for splitting the light from the light source part into channels.

3. The system of claim 2 wherein said light source part is a continuous wave laser.

4. The system of claim 3 wherein said means part for controlling the light is a fiber based variable optical attenuator.

5. The system of claim 4 wherein said means part for conveying light between the system parts is a silica glass fiber.

6. The system of claim 5 wherein said doped fiber part is a doped chalcogenide fiber.

7. The system of claim 5 wherein the chalcogenide fiber is based on selenium.

8. The system of claim 7 wherein said fibers are selected from the group consisting of single mode fibers multi mode fibers and mixtures thereof, and core diameters of said fibers are in the range of 1-500 µm.

9. The system of claim 8 wherein said laser emits light of about 2 µm wavelength and the doped fiber re-emits the light at 3-5 µm.

10. A method for projecting a scene that can simulate light temperature of above 2000 K comprising the steps of generating light at a lower wavelength; passing the light through a rare earth-doped fiber; individually controlling temporal characteristics, temporal dynamics, brightness and contrast of the light; and re-emitting the light from the doped fiber at a higher wavelength, wherein said generating step generates light in the near infrared region and wherein said re-emitting step emits light in the infrared region.

11. The method of claim 10 which includes the step of splitting the light into channels.

12. The method of claim 11 wherein the generated light is of a continuous wavelength.

13. The method of claim 12 wherein said step of controlling the light is effected by means of a fiber based variable optical attenuator.

14. The method of claim 13 including the step of conveying light by means of a silica fiber.

15. The method of claim 14 wherein said step of re-emitting the light is effected by means of a rare earth doped chalcogenide fiber.

16. The method of claim 15 wherein the chalcogenide fiber is based on selenium.

17. The method of claim 16 wherein the fibers are selected from single mode fibers, multimode fibers and mixtures thereof, and wherein their core diameters are in the range of 1-500 µm and their clad thickness is in the range of 5 µm to 1000 µm.

18. The method of claim 17 wherein said generating light step is carried out by generating light of about 2 µm wavelength and said re-emitting step is carried out by re-emitting light in the 3-5 µm range.

* * * * *